United States Patent
Anthony et al.

[19]

[11] Patent Number: 5,970,201
[45] Date of Patent: Oct. 19, 1999

[54] POWER REGULATION IN OPTICAL NETWORKS

[75] Inventors: Philip John Anthony, Bridgewater; Fred Ludwig Heismann, Tinton Falls, both of N.J.; Edmond Joseph Murphy, Bethlehem, Pa.; Timothy O. Murphy, Fairport, N.Y.

[73] Assignee: Lucent Technologies Inc., Murray Hill, N.J.

[21] Appl. No.: 08/932,837

[22] Filed: Sep. 18, 1997

[51] Int. Cl.[6] ........................................ G02B 6/00
[52] U.S. Cl. .................. 385/140; 385/16; 385/24; 385/45
[58] Field of Search .................. 385/140, 45, 1–9, 385/14–24, 39, 43

[56] References Cited

U.S. PATENT DOCUMENTS 4,886,334  12/1989  Aoki .......................................... 385/45
5,864,643  1/1999  Pan ............................................ 385/16

*Primary Examiner*—Phan Palmer
*Attorney, Agent, or Firm*—Lester H. Birnbaum

[57] ABSTRACT

The invention disclosed is a circuit for regulating optical power levels. Electrooptic attenuators are used to control optical output intensity by means of feedback loops from the outputs of the attenuators to the electrodes of the attenuators which determine the amount of light going to the outputs. The attenuators may be used in combination with an optical switch array in a wavelength division multiplexing system.

14 Claims, 3 Drawing Sheets

POWER REGULATION IN OPTICAL NETWORKS

This invention was made with Government support under Agreement No. MDA972-94-3-0036 awarded by ARPA. The Government has certain rights in the invention.

FIELD OF THE INVENTION

This invention relates to optical networks, and in particular to automatic power regulation in optical networks and such as those including cross-connects.

BACKGROUND OF THE INVENTION

Optical networks employing wavelength division multiplexing (WDM) are now receiving a great deal of attention due to their ability to carry enormous amounts of information over a single optical fiber. Such networks typically require the monitoring and adjustment of the power levels of each wavelength component in order to produce a balanced performance. This automatic power control is usually performed by discrete mechanical attenuators in the optical cross-connects or in other network nodes where the signals are demultiplexed into separate waveguides.

The mechanically controlled attenuators tend to be large and expensive. In addition, they are usually too slow to remove (compensate) rapid fluctuations in the optical power which result, for example, from polarization-dependent insertion loss in the optical components of the transmission line (including the optical switch) and random variations in the state of polarization of the optical signals. Such fluctuations might also occur in optically amplified WDM transmission systems when one or several wavelength channels are added or dropped.

SUMMARY OF THE INVENTION

The invention is a circuit for controlling optical power levels. The circuit includes at least one electrically controllable optical attenuator having an input for receiving an optical input signal, at least one electrode, and an output for delivering an output signal wherein the output signal power level is normally dependent upon the polarization of the input signal. The circuit further includes a feedback loop comprising a photodetector optically coupled to at least a portion of the output signal and electrically coupled to the electrode of the attenuator for controlling the power level of the output signal in response to the electrical signal from the photodetector. The feedback loop results in the power level of the output signal being essentially independent of changes in polarization of the input signal.

BRIEF DESCRIPTION OF THE DRAWINGS

These and other features of the invention are delineated in detail in the following description. In the drawing.

It will be appreciated that, for purposes of illustration, these figures are not necessarily drawn to scale.

DETAILED DESCRIPTION

Figure 1:
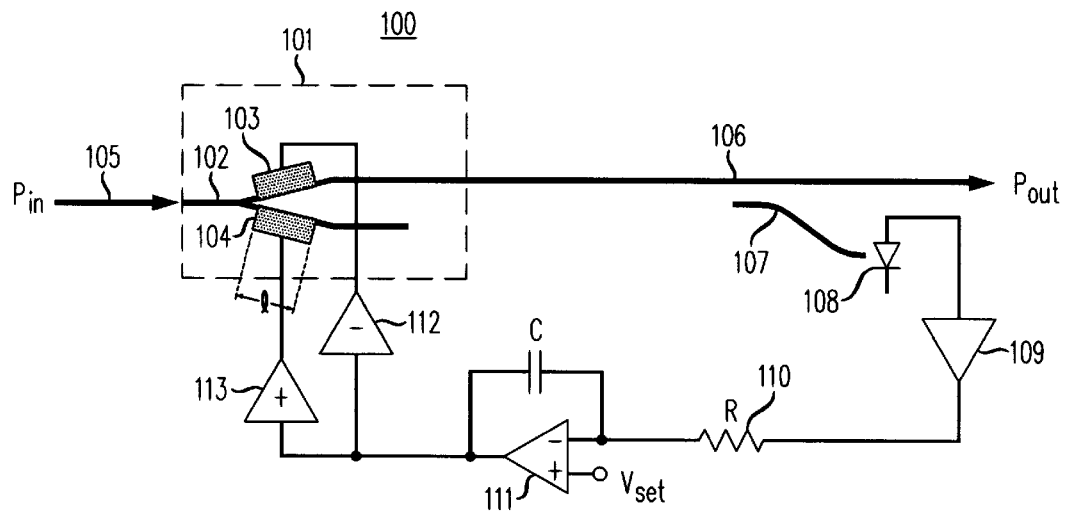
FIG. 1 is a schematic circuit diagram of the invention in accordance with one embodiment.

Referring now to the drawings, in which like reference numerals identify similar or identical elements, FIG. 1 illustrates a portion of an optical network employing a circuit for power optical control in accordance with an embodiment of the invention. In particular, an electrooptic attenuator, 100, is formed in a substrate, 101, such as lithium niobate, by fabricating a Y-configuration waveguide, 102, in accordance with known techniques. Formed over the two output branches of the waveguide, also by known techniques, are corresponding electrodes, 103 and 104. The input branch of the waveguide, 102, is coupled to an optical fiber, 105, which transmits an input optical signal. Only one of the output branches of the waveguide is coupled to an output fiber, 106, while the other output branch is unconnected. The resulting electrooptic waveguide modulator is capable of generating electrically controllable attenuation of the optical signal transmitted from the input fiber, 105, to the output fiber, 106.

An optical tap, 107, receives a portion, e.g., 1 to 10 percent, of the output signal from the fiber, 106. The tap, 107, is coupled to a low-speed photodetector, 108, such as a p-i-n photodiode, which converts the optical signal to an electrical signal. The photodetector, 108, is connected to an amplifier, 109, whose output is connected through a resistor, 110, to the inverting input of an integrating amplifier, 111. The non-inverting input of the integrating amplifier, 111, is connected to a reference voltage, $V_{set}$. The output of the integrating amplifier, 111, is connected to a pair of inverting and non-inverting electrical amplifiers, 112 and 113, which act as drivers to apply voltages of opposite polarity to the corresponding electrodes, 103 and 104.

While it is known to apply voltages to a Y-configuration waveguide in order to controllably direct the optical input signal to either one of the two output branches, thereby establishing an electrically controllable 1×2 optical switch, and while it is further known that the amount of light directed to any of the two output branches can be varied continuously between minimal and maximal levels, the use of such a Y-configuration waveguide arrangement for regulating optical power levels in optical networks has previously been considered impractical because it is also known that, for any given voltage applied to the electrodes, the relative amounts of input light directed to either one of the output branches generally depend strongly on the state of polarization of the optical input signal.

Figure 2:
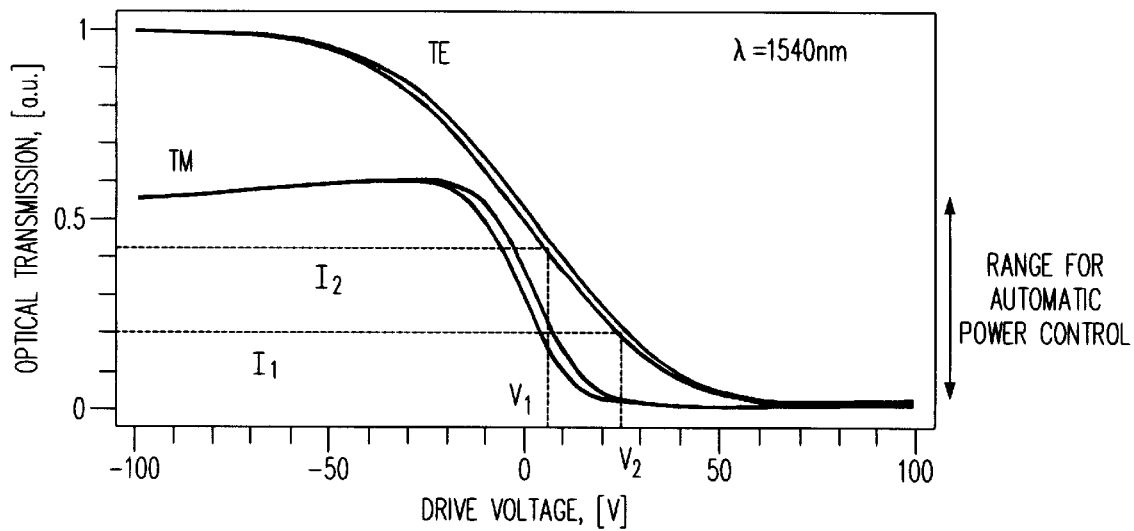
FIG. 2 is an illustration of optical output intensity as a function of voltage applied to a portion of the circuit of FIG. 1.

The polarization dependence of the optical signal transmission from the input port to one of the output ports of the Y-configuration waveguide is demonstrated in the graph of FIG. 2, which shows the optical output powers for TE-polarized and TM-polarized input light to the waveguide as a function of voltage applied between the two drive electrodes, 103 and 104, of the Y-configuration waveguide.

It is clearly seen from this graph that the optical power observed at the output port under investigation changes at substantially different rates with the applied voltage when the input light is TM-polarized or TE-polarized.

Furthermore, the power levels at maximal transmission may be different for TE-polarized and TM-polarized input light, because of polarization-dependent loss in the waveguides.

As a result, the drive voltage required for obtaining a certain power level at the output port (e.g., $I_1$), may be substantially different for TE-polarized and TM-polarized input light.

However, FIG. 2 also shows that there exists a common voltage range (−60 to −100 volts) over which the transmission through the Y-configuration waveguide is maximal for both TE-polarized and TM-polarized input light for a length, 1, of the electrode having a value of 7.5 mm. Likewise, there is a common voltage range (60 to 100 volts) over which the transmission is minimal for both polarization states. These voltage ranges will change if the attenuator design is changed. For instance a longer Y-configuration waveguide will produce lower voltage operations.

Applicants have discovered that under these circumstances, it is always possible for any arbitrary input polarization state to find a drive voltage for the waveguide switch that produces the desired output power at the selected output branch of the waveguide.

Moreover, it was also discovered that this voltage can be generated automatically by a circuit that employs a fast feedback path between the output port of the waveguide and the drive electrodes.

If this feedback circuit is further designed to exhibit response times that are substantially faster than the fastest changes in the polarization state of the input signal (e.g., faster than 1 ms) then the output power of the waveguide can be controlled continuously to any desired value in the range indicated in FIG. 2, independent of any polarization changes in the input light. This automatic power control is achieved by monitoring the average optical power level at the output of the waveguide and by adjusting the voltage applied to the waveguide to the value that yields the desired output power level.

In particular, the electrical signal produced by the photodetector, 108, in response to the optical output signal from tap 106 is converted to a voltage and compared with the reference voltage, $V_{set}$, at the integrating amplifier 111. A change in the output voltage of the integrating amplifier is produced when the voltage generated by the photodetector differs from the reference voltage, $V_{set}$, and the resulting voltage is applied to the amplifiers 112 and 113. These amplifiers will apply to the electrodes 103 and 104 voltages of opposite polarity proportional to the voltage generated by the integrating amplifier. The application of the variable voltages to the electrodes, 103 and 104, will vary the intensity of light coupled to the output branches of the waveguide, 102, until the desired optical power is transmitted to the output branch coupled to the output fiber, 106. For example, assume it is desired to maintain light intensity at a value $I_1$. This would require a drive voltage of approximately $V_1$ for a TM-polarized input signal as shown in FIG. 2. If the input polarization state should shift to the TE mode in the input fiber, the intensity will increase to a value of $I_2$. The photodiode, 108, will detect the change in output intensity and couple the corresponding change in voltage to the input of the integrating amplifier, 111. A signal would be generated at the output of the integrating amplifier, to change the voltages applied to the electrodes, 103 and 104, of the attenuator, 100, to a value of approximately $V_2$ to return the intensity to the desired value of $I_1$. It should be noted that the operation of the Y-configuration waveguide attenuator as a power regulator does not depend on the direction of light propagation through the attenuator: i.e., the main output port coupled to output fiber 106 in FIG. 1 may be used as the inport port and likewise the input port coupled to fiber 105 as the output port.

It will be appreciated that, in the absence of polarization dependent loss, the output branch not connected to fiber 106 can be utilized as the feedback path by coupling that branch directly to photo detector 108.

It will also be appreciated that while a single, Y-configuration attenuator is illustrated in FIG. 1, several such attenuators may be coupled in cascade oriented either in the same or in opposite directions. One or more of such attenuators may also be used in parallel in combination with a switch array as shown in the embodiment illustrated in FIG. 3.

Figure 3:
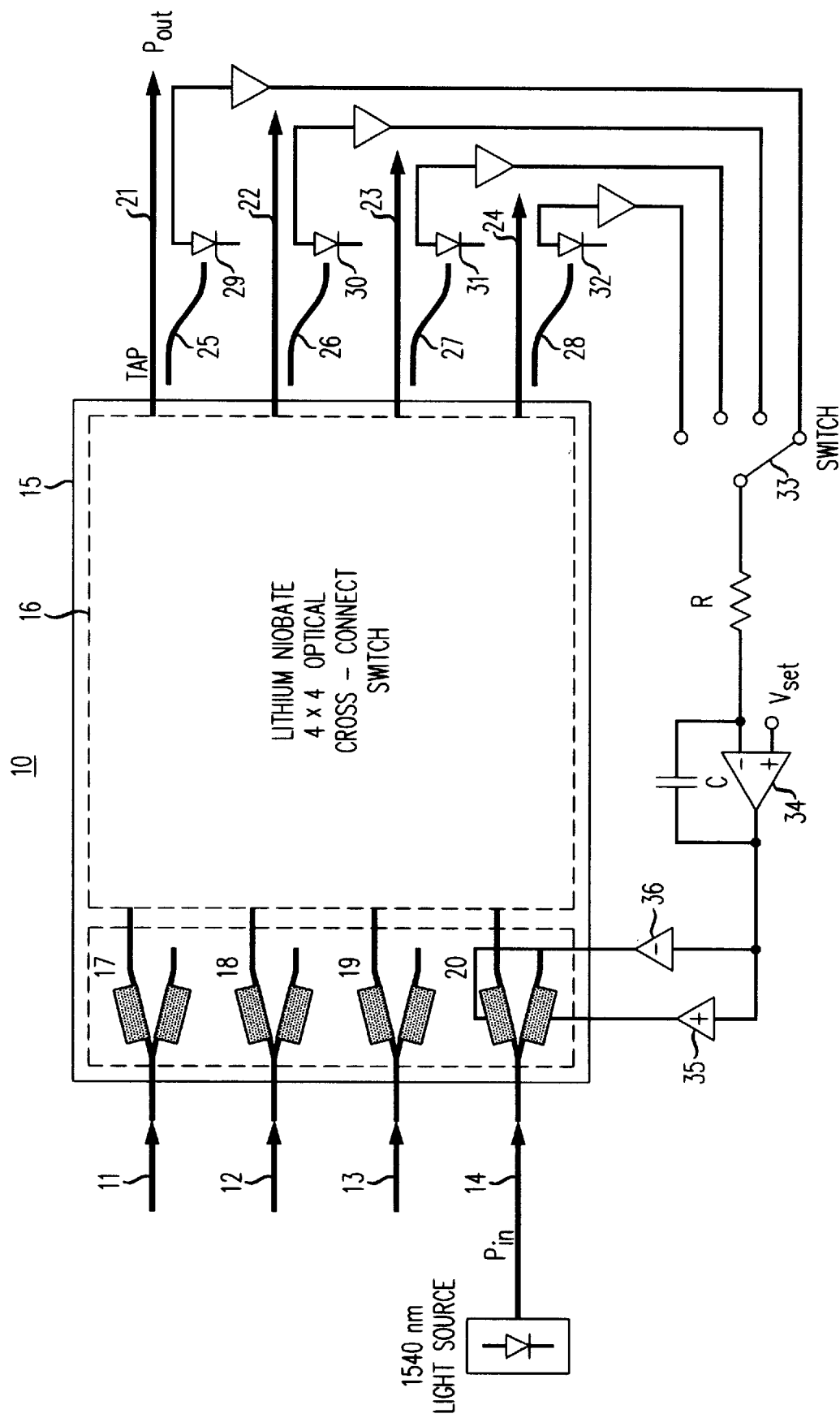
FIG. 3 is a schematic circuit diagram of the invention in accordance with a further embodiment.

As shown in FIG. 3, optical signals of the same or different wavelengths are incident on separate optical fibers, 11–14. While only four input fibers are shown, it will be realized that any plurality of fibers may be utilized. A lithium niobate substrate, 15, was also employed. The substrate included a standard M×N nonblocking switch array, 16, where M and N in this example are both equal to 4.

The substrate, 15, also included a linear array of, in this example, four Y-configuration waveguide attenuators, 17–20, such as shown and described previously. Again, the number of attenuators can be chosen according to particular needs. Each of these attenuators, 17–20, comprises a Y-configuration waveguide within the lithium niobate substrate having an input coupled to one of the input fibers, 11–14, and two outputs. Only one of the outputs of each attenuator was coupled to a corresponding switch of the switching array, 16, and the other output was left unconnected (although it is not necessary to leave it unconnected for the current invention).

Optical fibers, 21–24, were coupled to corresponding outputs of the switching array, 16. Each fiber included a tap, 25–28, for tapping off a portion of the optical signal at the switch output. The portions of the output signals from each tap were coupled to corresponding photodetectors, 29–32, where the tapped signals were converted to electrical signals. Each resulting electrical signal was connected to a corresponding input port of an electrical 4 by 4 switch, 33. (For purposes of illustration, only one of the output ports of switch 33 is shown.) Each output port of the switch, 33, was coupled through a resistor, R, to the inverting input of an integrating amplifier, 34. In this example, the resistor, R, was approximately 2 kilohm. The non-inverting input of the integrating amplifier, 34, was connected to a reference voltage, $V_{set}$. In this example, $V_{set}$ was continuously variable between 0.01 volts and 10 volts. A capacitor, C, which in this example was approx 10 nF, was connected between the inverting input and the output of the integrating amplifier. The output of the integrating amplifier, was connected to a pair of amplifiers, 35 and 36, which were used to apply voltages of opposite polarity to the electrodes of the attenuator, 20. (It will be appreciated that only the feedback circuit connected to switch 20 is shown for illustrative purposes. Identical circuits for each of the other attenuators, 17–19, would also be present. Each such circuit would be connected to one of the output ports of the electrical switch, 33, to establish the appropriate connection between the output of the switch 16 and the power-controlling attenuator. In the example shown, the input at fiber 14 would appear at output fiber 21.)

Figure 4:
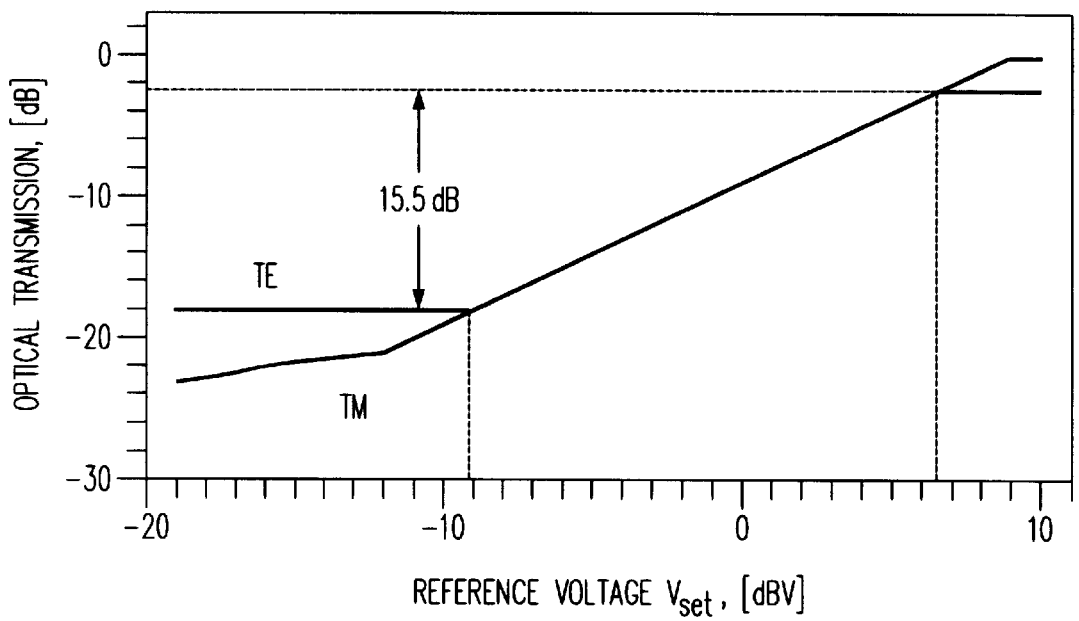
FIG. 4 is an illustration of optical output intensity in one of the output ports of the switch array in FIG. 3 as a function of voltage, for TE- and TM-polarized input light.
Figure 5:
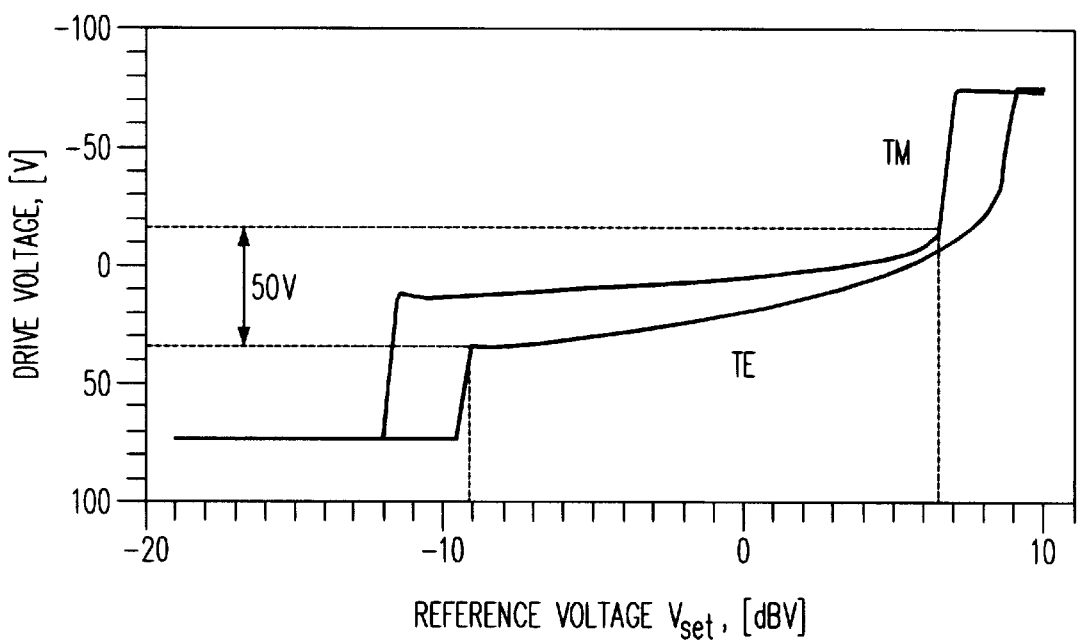
FIG. 5 is an illustration of drive voltage applied to a portion of the circuit of FIG. 3 for TE- and TM-polarized input light.

In accordance with a feature of the invention, the feedback signals provided by the photodetectors, 29–32, and the integrating amplifier, 34, can vary the voltages supplied by the drivers, 35 and 36, to the attenuators, 17–20, in such a manner as to variably adjust the power of the optical signals at the output of the switch array, 16, to any desired value between a maximal and a minimal power level, regardless of the polarization of the incoming signals. This feature is illustrated by the graphs of FIGS. 4 and 5 where FIG. 4 shows the relative optical power transmitted through the switch array, 16, as a function of reference voltage ($V_{set}$) for TE- and TM-polarized light having a wavelength of 1540 nm, and FIG. 5 shows drive voltage as a function of reference voltage for the same light. FIGS. 4 and 5 show that the Y-branch attenuator in this experiment is capable of regulating the output power level over a total range of 15.5 dB with drive voltages in the range +35 V to −15 V. The control range can be increased to about 27 dB by cascading two Y-branch attenuators in series where both switches are driven by the same voltages in the range −39 V to +28 V.

It was discovered that polarization-independent automatic power control can be obtained with the circuit of FIG. 3 even when the input polarization state changes very rapidly at rates of more than 6000 radians per second, which is much faster than the speeds of normal polarization fluctuations in optical fibers. This was confirmed by applying to the input fibers, e.g., 14, a fast electrooptic polarization scrambler (not shown) which was driven by a 500 MHz sawtooth voltage. Without the feedback circuit, rapid power undulations (of the order of 2 dB) which resulted in polarization-dependent insertion loss in the switch array were observed as the input polarization state varied between TE- and TM-polarized light. These undulations disappeared when the feedback circuit of FIG. 3 was included. Thus, the power control circuit of FIG. 3 can effectively maintain a given power level and remove power variations due to polarization dependent losses.

Various modifications will become apparent to those skilled in the art. For example, the attenuators, 17–20, could be located at the output of the switch array, 16, rather than at the input as shown. Such a configuration would eliminate the need for an electrical switch, 33, in the feedback paths since each tap, 29–32, could be tied directly to its associated power-control circuit and attenuator. Further, additional components such as splitters can be included on the substrate, 15, to provide additional optical paths in accordance with known techniques.

Further, the attenuators 7–20, may also employ X-configuration waveguide structures, instead of Y-configuration waveguide structures, as well as directional coupler structures or Mach-Zehnder interferometer structures. It is further apparent that the substrate material for the attenuators is not limited to lithium niobate but may be any of a variety of other known materials used for integrated optics, such as lithium tantalate, glass, or a semiconductor material. Also, it will be appreciated that the effect for controlling the optical intensity in the attenuator may not be limited to the electrooptic effect but also include thermooptic and acoustooptic effects.

Moreover, in the case of a multiple input or multiple output port attenuator, such as the aforementioned Y-configuration waveguide structure, the attenuator may also be used as a re-configurable add/drop switch and, in particular, as a controllable disconnect switch for electrical on-off control of the optical signal.

The invention claimed is:

1. A circuit for controlling optical power levels comprising:

at least one electrically controllable optical attenuator having an input for receiving an optical input signal, at least one electrode, and an output for delivering an output signal wherein the output signal power level is normally dependent upon the polarization of the input signal; and a feedback loop comprising a photodetector optically coupled to at least a portion of the output signal and electrically coupled to the at least one electrode of the attenuator for controlling the power level of the optical output signal in response to the electrical signal from the photodetector whereby the feedback loop results in the power level of the output signal being essentially independent of changes in polarization of the input signal.

2. The circuit according to claim 1 wherein the attenuator comprises a Y-configuration waveguide formed in a substrate.

3. The circuit according to claim 3 wherein the substrate comprises lithium niobate.

4. The circuit according to claim 1 wherein the attenuator comprises an electrooptic modulator for controlling the intensity of the optical signal.

5. The circuit according to claim 1 wherein the photodetector is coupled to the electrodes through an integrating amplifier.

6. The circuit according to claim 1 wherein the photodetector is coupled to the output of the attenuator through an optical tap coupled to an output optical fiber.

7. A circuit for regulating optical power levels comprising:

an M×N optical switch array, where M and N are integers;

a plurality of parallel connected electrically controlled attenuators coupled to the switch array, each attenuator including an input for receiving an optical input signal, at least one electrode, and an output for delivering an optical output signal wherein power level of the output signal is normally dependent upon polarizations of the input signal; and feedback loops each including a photodetector optically coupled to at least a portion of the output signal from a corresponding attenuator and electrically coupled to the at least one electrode of the corresponding attenuator for controlling the power level of the output signal in response to the electrical signal from the photodetector, whereby the feedback loop results in power levels of the output signal being essentially independent of changes in polarization of the input signal.

8. The circuit according to claim 7 wherein the attenuators comprise Y-configuration waveguides formed in a substrate.

9. The circuit according to claim 8 wherein the substrate is lithium niobate.

10. The circuit according to claim 8 wherein the switch array is formed in the same substrate.

11. The circuit according to claim 7 wherein the attenuators are electrooptic modulators.

12. The circuit according to claim 7 wherein the photodetectors are electrically coupled to the electrodes of the attenuator through at least one integrating amplifier.

13. The circuit according to claim 7 wherein the outputs of the attenuators are coupled to the photodetectors through the switch array.

14. The circuit according to claim 7 wherein the inputs of the attenuators are coupled to the outputs of the switch array.

* * * * *